Aug. 29, 1933.  H. W. WEBB  1,924,701
PROCESS FOR PRODUCING FLEXIBLE SHAFTS
Filed Jan. 9, 1930
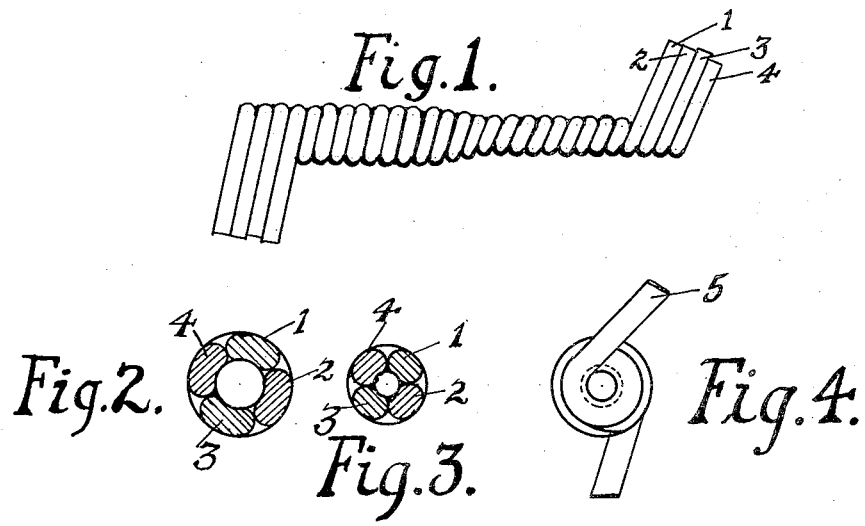
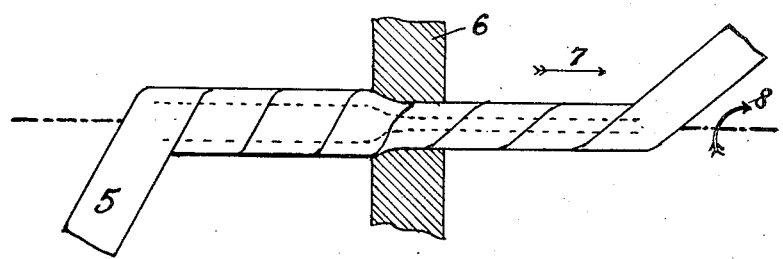
Hartwell W. Webb,
INVENTOR Patented Aug. 29, 1933

1,924,701

UNITED STATES PATENT OFFICE 1,924,701

PROCESS FOR PRODUCING FLEXIBLE SHAFTS

Hartwell W. Webb, Pleasant Plains, Staten Island, N. Y.

Application January 9, 1930. Serial No. 419,722

2 Claims. (Cl. 29—148)

This invention relates to the processes for producing flexible shafts such as are used to convey torque power or effect distant control or indication by rotation about a curved or tortuous axis, and particularly those built up of super and subjacent layers, wound or formed in alternately opposite hand, of helical metal strands. Such shafts are of two general classes; one with a hollow quasi-tubular helical innermost member of one or more strands, and the other with a solid cylindrical core of metal. The present invention comprises the processes for producing a central member of new and improved construction, to function as a flexible core, and of production of a new and improved shaft, embodying such a central core member, and possessing certain advantageous characteristics of each of these two classes. A brief summary of the characteristics of the two classes will clarify the disclosure of the nature and pertinence of my invention.

A shaft with solid core has the intrinsic advantage of high torsional rigidity and of small phase lag under load by reason of its rigid central member, but has the disadvantage of considerable power losses through internal friction under load and of whip from non-uniform rotation if the core suffer distortion or be of imperfect circular section, while the radius of the arc of effective operation is sharply limited by tension and compression strains set up within the core and its useful life is limited by metal fatigue from this cause.

The hollow core shafting has low power losses from internal friction owing to its construction with space between super, sub and adjacent strands, is relatively free from whip and distributes its stresses by mutual adjustment of contiguous layers to permit rotation in a loop of small radius of arc with long life and without metal fatigue. As at present constructed, it lacks torsional rigidity, will not carry temporary overload without elongating and has relatively large phase lag under load. The principal object of my invention is to produce a flexible shaft that combines the high torsional rigidity of the solid core type and its small phase lag under load with the specified several advantages of the hollow centre type. I accomplish this by producing a new type of core member and a flexible shaft of which it forms the innermost member, in a manner and by means heretofore unknown to the art. The core member consists of a quasi-tubular helically formed member having a bore smaller in diameter in proportion to the outside diameter of the core member than has heretofore been produced or employed in the art. In my coincident application of even date, I disclose the core member and the shaft in which it is embodied and claim them as structurally new in the art.

Fig. 1 represents a quasi-tubular helical member, whose four strands, 1, 2, 3 and 4 are partly unwrapped at each end, and whose left portion represents the member, before, and whose right portion represents the member, after undergoing a process of reduction in accordance with my invention. Fig. 1 represents the member as it would appear if removed from the reduction means when but half the member had passed through and been processed.

Fig. 2 represents a diagrammatic section of the left or unprocessed half of the member of Fig. 1 in a plane perpendicular to the axis thereof, and shows the relatively large diameter of the bore in proportion to the diameter of the member.

Fig. 3 represents a diagrammatic section of the left or processed half of the member of Fig. 1 in a plane perpendicular to the axis thereof, and shows the relatively small diameter of the bore in proportion to the diameter of the member.

Fig. 4 represents diagrammatically a helical member consisting of a single close coiled helix, 5 of rectangular section unwrapped at each end and part processed by diametric reduction, as it would appear looking along its axis with the processed end in the foreground.

Fig. 5 shows diagrammatically the helical member, 5, of Fig. 4 consisting of a close coiled helix of rectangular section, unwrapped at each end, as it would appear in process of being reduced in diameter by traction in the direction of the arrow, 7, and torsion in the direction of the arrow, 8, through the die, 6, shown in section. From the drawing it will be evident that the axial pitch of the helical member lengthens in passing through the circular die, 6.

Fig. 6 shows the application of the core structure incorporated in a fabricated section of shafting having two layers of wire strands coiled thereon in opposite directions.

It is evident that the die, 6, might rotate in a direction opposite to the direction of the arrow, 8, and torsion of the emergent product be omitted, or that the die and emergent product might rotate in opposite direction to each other, the effect on the emergent product being the same as long as torsion upon it is maintained in the direction of the arrow, 8. It is preferable that the axial pull, as indicated by the arrow 7, and torsion or tangential pull, as indicated by the arrow 8, should mutually cause the member in course of reduction to follow a spiral course through the reduction means, 6, whose pitch is neither so long as that of the emergent, nor so short as that of the entrant portion of the member, 5. The deforming pressure of the die will then act in a path paralleling the spiral cleavage between the convolutions of, 5, of Fig. 5, or in case of a multistrand helix as represented in Fig. 1, it will act in a path parallel to the convolutions of the strands, 1 2 3 and 4. It is preferable in all cases to maintain the tangential pull at a value that will keep the cleavage space or spaces at a uniform predetermined width depending on the radius of arc of the loop in which the shaft embodying the emergent member is designed to rotate. It is part of my invention that the action of the reducing means upon the outer surface of the component strand or strands of the helical member shall tend to deform the strand or strands to more accurate cylindrical surface in case of the emergent than was possessed by the entrant helical member. It is likewise part of the invention that the metal composing the strand or strands and adjacent to the area or areas swept over by pressure of the reducing means, shall acquire enhanced hardness, higher tensile strength and closer fibre. To secure this result more effectively I may cause the helical member to rotate more rapidly relative to the reducing means than necessary to advance it through the reducing means in a path parallel to the spiral cleavage or cleavages, though it is generally preferable to maintain the spiral course as before described. I may substitute for the die, 6, equivalent means, as for example, swaging dies, without departing from the spirit of my invention.

In carrying out my invention, a helical structure of cylindrical form is coiled or wound from suitable spring stock customarily used for the innermost layers of flexible shafting, of the smallest practical bore the properties of the stock will admit without subjecting it to deteriorating strains, by either of the methods well known in the art. If coiled on an air core the ratio of bore diameter to outside diameter of the helix will be larger than if wound on a solid cylindrical mandrel which is subsequently removed. By the latter, which is the usual method, shorter lengths are obtained, which may have as low a ratio of bore diameter to outside diameter of the helix as 1 to 3 in case a very high grade mandrel is used. By the coiling method long continuous lengths may be obtained of a ratio not practically less than 1 to 2½. In other words, the smallest hole that is practically produced in the art by winding is of the same diameter as the thickness of the wall of the helix, and the smallest hole practically produced by coiling in long continuous lengths is about 30% larger. The helical structure is drawn or passed, preferably with simultaneous torsion, through a die of circular aperture or equivalent reducing means. Torsion may be effected by rotating the die or the emergent product or both but always in a direction to close the helix or helices and afford traction through the die in a spiral course preferably running lengthwise with the strand or strands of the helix. Consequential effects of passage through the reducing means are; reduction of diameter both external and of bore with negligible reduction in thickness of the wall of the helix, extension with elongation of pitch of helix, and deformation of coil of component strand or strands to section presenting greater proportionate area of cylindrical surface in the emergent than in the entrant helical structure.

The process of increasing the hardness of the metal adjacent to the die pressure follows the same laws that control similar increase of hardness and tensile strength in drawing a solid wire. To avoid over-drawing with consequent deterioration of the fibre of the metal, it is preferable to perform the reduction operation in more than one stage, the emergent product of the first stage becoming the entrant member of the second stage and so forth. While I can reduce the ratio of bore to outside diameter to 1 to 6 or even less, the objective of my invention is attained in a shaft for average use in which the ratio of bore diameter to outside diameter of the improved core member forming the innermost layer of the shaft, is about 1 to 4. The first step in constructing a shaft by my invention requires that the new core member be with minimum separation between adjacent strands or edges of a strand if but one convolution is employed. In the succeeding operations additional layers of wire strands 8 and 9 of opposed hand are coiled on the core in the same manner, well known in the art, as the layers are built up in constructing a solid core shaft. The final operation consists in elongating the shaft, which has, like a solid core shaft, remained of constant or approximately constant length during the building up of the layers, to a predetermined increased length, the percentage of elongation being determined by the use to which the shaft is to be applied. While the operation bears a general similarity to that used in finishing the hollow core shaft, it differs in the fact that the hollow core elongates during the operation of winding the first layer and the resultant of this operation elongates again during the winding of the next layer, etc., owing to the low tensile strength of the innermost layer of the hollow core shaft. This progressive elongation constitutes the difference between the manner in which a hollow core and a solid core shaft are built up. My new method and process of building a shaft as just described differ in that the elongation process has heretofore been applied only to shafting that has been progressively elongated in the process of construction to a degree rendering the effect of the final elongation a matter of guess work and trial rather than precision. In my new process the elongation is determined by the actual additional spacing it is determined to allow between convolutions of my new prestretched core member, and the final increase is accorded. The ratio of bore to outside diameter may also be stated in terms of relative volume. Thus, a diametric ratio of 1 to 3 corresponds to a proportion of 1 to 9 in relative volume. It is also to be noted that the multiple strand innermost layer, in the condition preliminary to winding another layer upon it, in a manner well known in the art, of the usual form of hollow cable, and so termed a hollow core in the well known art, is structurally similar to the multiple strand helical structure, shown in section in Fig. 2. Such a hollow core or in general any of the helical structures suitable for diametric reduction by my invention, might be used, in their unreduced condition, to wind additional layers upon and thus form hollow cables according to the well known art. The exception is that of long continuous helical structures which may be coiled, but which cannot, in the present state of the art, be worked up into hollow shafting without preliminary cutting into short lengths. It is evident that by treating such long continuous helical structures in accordance with my invention, the enhanced tensile strength enables them to be wrapped with additional layers in the same manner as a solid core and long continuous shafting to be produced in like manner with similar advantage in labor, rate of production and reduction of wastage.

I claim;

1. The process of producing a flexible shaft which consists in producing a helical core structure of stranded material, reducing the diameter of said core structure by a drawing or stretching action thereby changing the pitch of the helices of said structure in a direction tending to parallel the axis of said structure and winding a series of layers of strands upon said core structure in relatively opposite directions.

2. The process of producing a flexible shaft which consists in producing a helical core structure of stranded material, reducing the diameter of said core structure by a drawing or stretching action thereby changing the pitch of the helices of said structure in a direction tending to parallel the axis of said structure and winding a series of layers of strands upon said core structure in relatively opposite directions, and stretching the shaft structure thus fabricated to afford a slight clearance between the adjacent strands of the several coiled layers superposed upon said core.

HARTWELL W. WEBB.